Oct. 17, 1933.  L. C. BONNOT  1,931,371
PLASTIC MATERIAL MANUFACTURE
Filed May 10, 1932  2 Sheets-Sheet 1
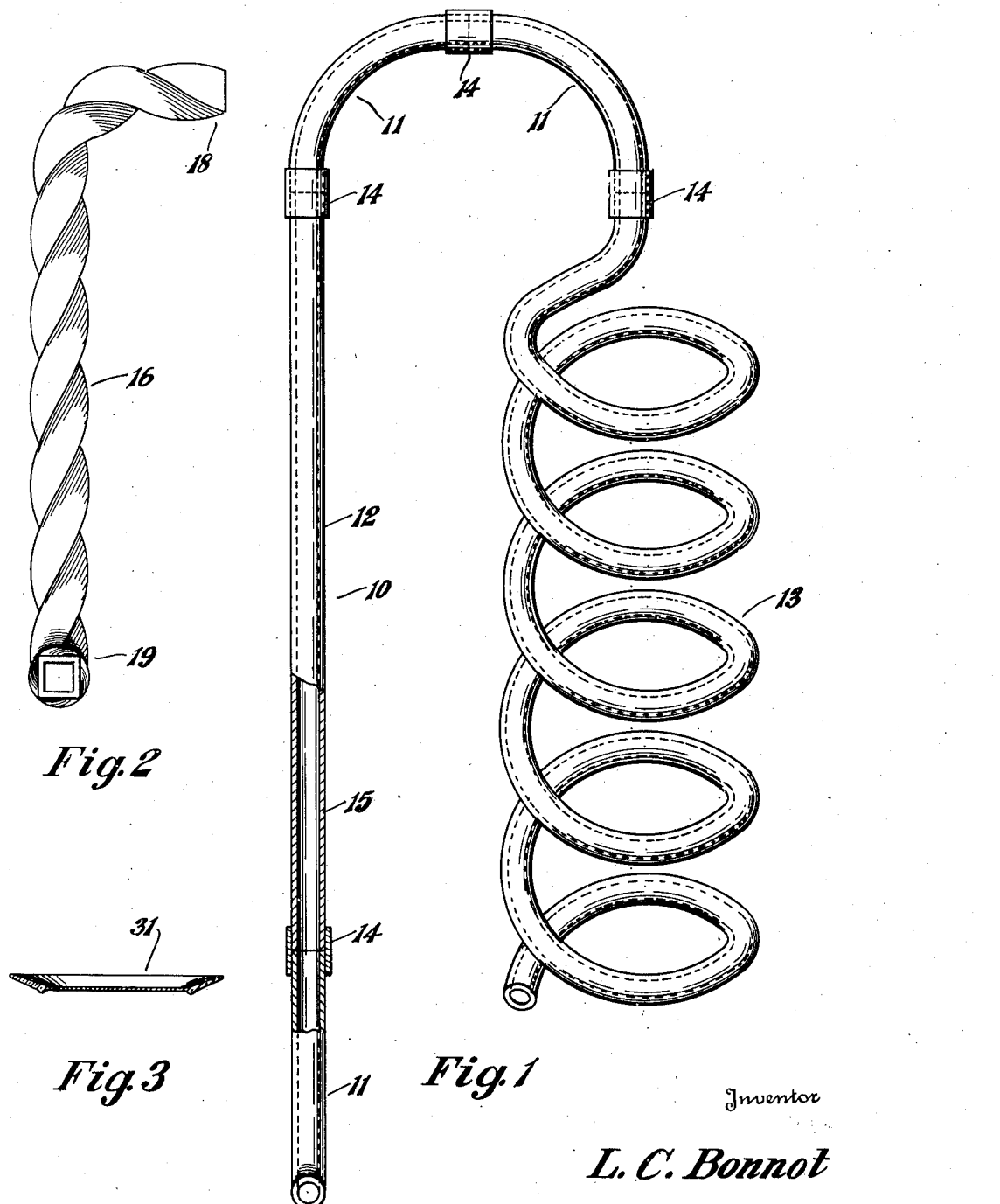

Oct. 17, 1933.  L. C. BONNOT  1,931,371
PLASTIC MATERIAL MANUFACTURE
Filed May 10, 1932   2 Sheets-Sheet 2
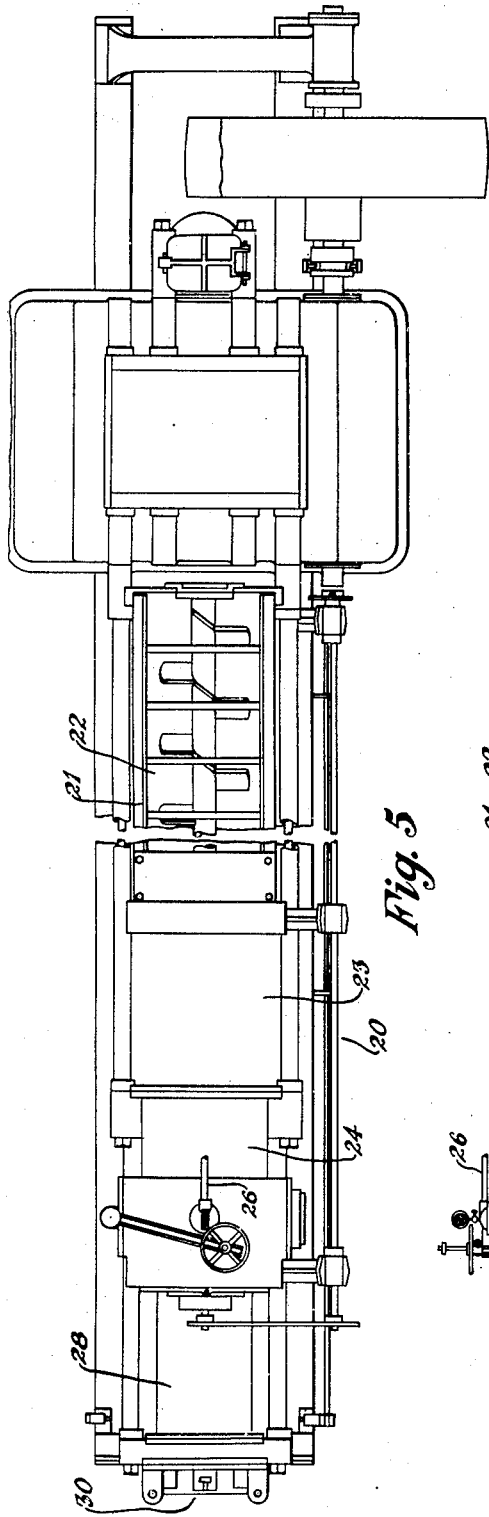
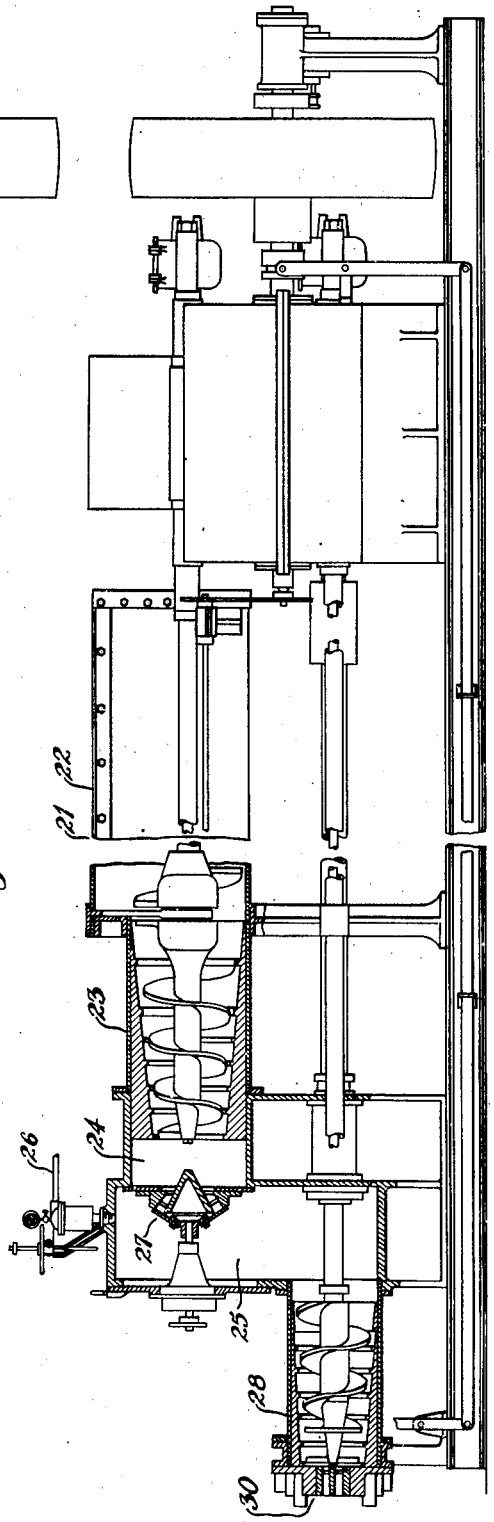
Fig. 5
Fig. 4
Inventor
L. C. Bonnot Patented Oct. 17, 1933

1,931,371

UNITED STATES PATENT OFFICE 1,931,371

PLASTIC MATERIAL MANUFACTURE

Louis C. Bonnot, Louisville, Ohio, assignor to The Bonnot Company, Canton, Ohio, a corporation of Ohio Application May 10, 1932. Serial No. 610,421

7 Claims. (Cl. 25—156)

The invention relates to the manufacture of products of plastic materials, and more particularly to the manufacture of products of ceramic materials such as clays, shales, and mixtures of the same, and the manufacture of which includes forming by any desired means, units from a plastic mass of the material, drying the units, and then usually firing the units to make the finished burned ceramic products.

The invention also relates to the manufacture of units from plastic materials, such as certain clays, shales and mixtures of the same, and such as Portland cements, and the manufacture of which includes forming by any desired means, units from a plastic mass of the material, and then drying and hardening the formed units directly in the air or atmosphere without requiring firing.

In the manufacture of such products as heretofore carried out, the plastic materials as ordinarily used have had such physical characteristics as to require immediate forming of the unit to its final shape, after preparing as by tempering, or mixing, the plastic material in a plastic state.

Moreover, unit products made from plastic materials of the foregoing description have been subject to form limitations, which have practically precluded the manufacture of any form which could not be obtained by a single extrusion operation, or by a single molding operation.

In other words it has never been possible prior to the present invention to make a bent, a twisted, or a bent and twisted or otherwise reshaped extrusion product from plastic material such as clays, shales, and mixtures including the same, or such as Portland cements, because the usual longitudinally extending green column, or unit severed therefrom, cannot be displaced laterally from its longitudinally straight formation, without collapse of the body, wall, or walls of the column or unit.

From the standpoint of providing bent, twisted, or bent and twisted extruded ceramic products, and particularly bent, twisted, or bent and twisted extruded tubular ceramic products, such products, hitherto not available, are very desirable for use in pipe systems particularly, in the chemical, metallurgical, and processing industries, for insulation purposes either with respect to heat or electricity, and for conduits.

It is desirable to provide a unit which is bent or curved by having its longitudinal axis in a single plane, and having its body bent about an axis at right angles to the plane of the longitudinal axis, so as to form for example a pipe elbow.

It is also desirable to provide a unit which is twisted by having its body twisted about its longitudinal axis, as for example to form elongated ornamental units of square or rectangular cross sections.

It is also desirable to provide a unit which is bent and twisted, as for example to form a tubular coil either spiralled or helixed, for use as a condenser or heat transfer unit.

Many different reasons have been advanced for the aforesaid form limitations heretofore encountered in the manufacture of products or articles of manufacture from such materials as the ceramic or fire hardening materials, such as clays, shales, and mixtures including the same, or the air hardening materials, which include some clays, shales, and mixtures including the same, as well as Portland cements.

All of such plastic materials may be termed heterogeneous plastic materials, because each comprises a mixture of solids, liquids, and gases, and the gases may or may not be that mixture of gases ordinarily called air, and it has become generally accepted that the gas content of such materials is one of the most important causes of the aforesaid form limitations.

Heretofore by aging or tempering treatments, there has been effected a limited reduction in the ratio between the mass of gas or gases, and the mass of liquids and solids in any unit mass of such a heterogeneous plastic material.

The term homogenizing may be said to indicate any treatment which effects a greater reduction in the ratio between the mass of gas or gases, and the mass of liquids and solids in any unit mass of such a heterogeneous plastic material, than is effected by the usual aging or tempering treatments.

Likewise, such a heterogeneous plastic material may be said to be homogenized when the ratio between the mass of gas or gases, and the mass of liquids and solids in any unit mass of the heterogeneous plastic material, is less than the ratio would be if the material had been subject to the usual aging or tempering treatments.

Such a heterogeneous plastic material may be said to be highly homogenized by degasifying when the gas content of the same has been substantially eliminated by any suitable treatment.

The objects of the present improvements include in general the provision of a method of making products from plastic materials of the foregoing description, and whereby the unit products in their final shapes need not be formed from the tempered or mixed plastic material immediately after tempering or mixing the same, and whereby the unit products are not limited to forms which may be attained by single extrusion operations, or by single molding operations, or the like.

More specifically, from the standpoint of form, the objects of the present improvements include the provision of a method of making preferably extruded products of plastic materials, such as clays, shales, or mixtures including the same, or such as Portland cements, and which are bent, twisted, or bent and twisted or otherwise reshaped to substantially any desired configuration.

The foregoing and other objects are attained by the methods, improvements, and combinations, which comprise the present invention, and the nature of which is set forth in the following general statement, and preferred embodiments of which are set forth in the following description, and which are particularly and distinctly pointed out and set forth in the appended claims forming part hereof.

The nature of the present invention may be set forth in general terms by stating that the improved method of making products from plastic materials such as clays, shales, or mixtures including the same, or such as Portland cements, includes homogenizing a mass of the plastic material, and subsequently forming units from the homogenized material.

The homogenized material may be stored in suitable containers and later used at the place of homogenizing or shipped in the containers to another place for having the final forming operation performed thereon.

In other cases it is preferred to extrude a column of the homogenized material immediately after the homogenizing operation, and then to distort the column, as by bending, twisting, bending and twisting, curving, coiling, or similar forming operations which displace the material of the column from its position determined by the initial extruding operation.

The homogenizing operation of the improved method is preferably carried out by reducing the gas content of comminuted or shredded plastic material, such as clay, shale, or mixtures including the same, preferably after the plastic material has been pugged and tempered by introducing the comminuted plastic material into a sealed chamber from which gases are being continuously pumped so that the pressure in the chamber is maintained at less than atmospheric and preferably at a vacuum of from 21 to 26 inches or higher of mercury, with a consequent continuous pumping away of the gas content of the comminuted plastic material introduced into the chamber, and then applying pressure to the shredded material having a reduced gas content, and extruding the material in the form of an elastic or rubbery homogenized mass, and the extrusion may be finally effected through a die which simultaneously forms a desired transverse cross sectional shape for the extruded homogenized column.

Typical embodiments of the improved products or articles of manufacture made by the use of the present improved methods, and an embodiment of an improved machine adapted for carrying out certain steps of the improved methods, are illustrated in the accompanying drawings forming part hereof, in which Figure 1 is an elevation view with portions in section illustrating a piping system embodying improved products made by the use of the improved methods hereof.

Fig. 2, an elevation view with portions in section illustrating another form of twisted, and bent and twisted elongated member made by the use of the improved methods hereof.

Fig. 3, a transverse sectional view of a china plate made by the use of the improved methods hereof.

Fig. 4, a side elevation with portions in section illustrating an embodiment of the preferred improved machine adapted for carrying out certain steps of the improved methods; and Fig. 5, a top plan view thereof.

Similar numerals refer to similar parts throughout the drawings.

In Fig. 1, products or articles of manufacture made by the use of the improved methods hereof are embodied in the piping system indicated generally by 10 and which includes improved elbows 11, a length of improved straight pipe 12, and an improved helix coiled pipe 13 connected with each other as by means of sleeves 14.

The length of improved straight pipe 12 constitutes a tubular member formed of homogenized plastic material. The length of the straight pipe or tubular member 12 may be 48 inches and upwards; the outside transverse cross sectional area of the tubular member 12 may be less than 4 square inches; and the thickness of the tubular wall 15 of the member 12 may be substantially within the limits ⅛ inch and $\frac{1}{16}$ inch.

The elbows 11 have the same outside transverse cross sectional areas as the straight pipe or tubular member 12, and the elbows 11 each constitute a bent or curved tubular member formed of homogenized plastic material.

The helix coiled pipe 13 may be a heat exchange coil, and constitutes a tubular member having the same outside transverse cross sectional area as the straight tubular member 12 and the elbows 11, and being bent and twisted, or helix coiled, it being understood that to form any helix from a straight member requires bending and twisting of the straight member.

The particular dimensions of the above defined dimensional limitations of the improved products depend upon the particular plastic material from which the same are made.

For example, Ohio No. 5 fire clay was homogenized, and the transverse outside diameter of each of the circular tubular members 11, 12, and 13, was 1$\frac{1}{16}$ inches, and the tubular wall thickness of each of the tubular members was $\frac{3}{32}$ inch, and the length of each of the members 11, 12 and 13 was over 48 inches.

Other tubular members were made of homogenized fire clay, and had an outside transverse cross sectional circular area of 1½ inches diameter, and had a wall thickness of ⅛ inch.

In Fig. 2 is illustrated a tubular member indicated generally by 16, and having a square cross section, and being twisted about its longitudinal axis, and being simultaneously bent or curved at its ends 18 and 19.

The tubular members 11, 12, and 13 comprise single tubular structures, but tubular structures including multiple tubes such as building or conduit tiles have been made according to the present improved methods.

Likewise, elongated members having solid cross sections have been made of homogenized plastic materials and have had improved dimensional and form characteristics, and each of said elongated members having solid transverse cross sectional areas may have any desired length of 48 inches and upwards, and the minimum dimension of their transverse cross sectional areas may be when desired substantially within the limits ⅛ inch and 1/16 inch, and when desired the outside transverse cross sectional area of each member may be less than 4 square inches, and the members may be bent, twisted, or bent and twisted to substantially any desired form.

In any event in any elongated member of homogened plastic material made by the use of the present improved methods, the minimum dimension of the transverse cross sectional area of the homogenized member is less than the minimum dimension of the transverse cross sectional area of a member having the same strength and the same maximum dimension of its similar transverse cross sectional area as the homogenized member and made, if at all possible, from the same material in its un-homogenized state.

When the improved member is an elongated tubular member of homogenized plastic material, the foregoing minimum dimension is the thickness of the tubular wall of the homogenized member which is less than the thickness of the tubular wall of a tubular member having the same strength and the same inside transverse cross sectional area as the homogenized member and made, if at all possible, from the same material in its un-homogenized state.

In other words a substantial saving in weight of material is obtained by the improved products for any given duty and made by the use of the improved methods hereof.

The improved products may also be made by the use of the improved methods hereof, from material which is otherwise not available for use in making a particular product, that is to say certain clays hitherto not practically possible to be formed into tubular shapes, may be produced and have the characteristics of the improved products.

The improved products are produced by the improved methods hereof, and carried out in part, preferably by the use of an improved homogenizing apparatus indicated generally by 20.

The apparatus 20 includes a pug mill 21 adapted to receive through an upper opening 22 therein in a usual manner the particular plastic material to be homogenized.

The pug mill 21 communicates with a screw extrusion press indicated generally by 23 which delivers the pugged or tempered plastic material from the pug mill 21 into a first sealing cylinder 24 from which the compressed material is introduced into a vacuum chamber 25, the gas content of which is continuously pumped away as through a pipe line 26 connected with a suitable pump, so that the pressure in the vacuum chamber 25 is continuously maintained at preferably from 21 to 26 inches or higher of mercury.

Before entering the vacuum chamber 25 the tempered plastic material preferably passes through a comminuting apparatus indicated generally by 27, and which is the invention of the present inventor.

The vacuum chamber 25 communicates with a screw extrusion press 28 where the final step of the homogenizing operation is completed by compressing the plastic material from which the gas content has been reduced by comminution or shredding of the same as it passes through the vacuum chamber 25.

The homogenized plastic material is then preferably extruded through a die indicated generally by 30 and which preferably forms the desired transverse cross sectional area of the green column of homogenized plastic material.

The homogenized green column is then severed to make self-sustaining straight green members such as the straight tubular member 12; or the green column, which has unusual elastic or rubbery characteristics, may be bent, twisted, or bent and twisted, to form in the green state the self-sustaining bent members 11, or the self-sustaining bent and twisted members 13, and 16, or otherwise further formed to substantially any desired configuration.

The improved members, such as 11, 12, 13, and 16, when made of ceramic materials requiring firing, are then dried in the usual manner, and fired; or when made of air hardening materials the improved members are permitted to air harden in a usual manner.

Instead of further forming the green column of homogenized material immediately as it issues from the apparatus 20, the homogenized plastic material may be stored in suitable containers and subsequently formed to any desired configuration, as for example in the shape of a china plate 31, which is subsequently formed from homogenized china clays, and has desirable characteristics, as aforesaid, and may be made of what has heretofore been considered inferior clay for china purposes.

I claim:

1. The method of making products from plastic materials, which includes homogenizing by degasifying a mass of plastic material, and subsequently forming and then reshaping units from the homogenized plastic material.

2. The method of making products from plastic materials, which includes homogenizing by degasifying a mass of plastic material, extruding a column of the homogenized material, and subsequently distorting the column.

3. The method of making products from plastic materials, which includes homogenizing by degasifying a mass of plastic material, extruding a column of the homogenized material, and then bending the column.

4. The method of making products from plastic materials, which includes homogenizing by degasifying a mass of plastic material, extruding a column of the homogenized material, and then twisting the column.

5. The method of making products from plastic materials, which includes homogenizing by degasifying a mass of plastic material, extruding a calumn of the homogenized material, and then bending and twisting the column.

6. The method of making products from plastic materials, which includes homogenizing by degasifying a mass of plastic material, extruding a column of the homogenized material, and then curving the column.

7. The method of making products from plastic materials, which includes homogenizing by degasifying a mass of plastic material, extruding a column of the homogenized material, and then coiling the column.

LOUIS C. BONNOT.